United States Patent

Bohlin et al.

[11] 3,908,772
[45] Sept. 30, 1975

[54] MEASURING DEVICE

[75] Inventors: Gunnar Karl Bohlin, Sundsvall; Rune Karl Eriksson, Kvissleby, both of Sweden

[73] Assignee: SCA Development Aktiebolag, Sundsvall, Sweden

[22] Filed: Aug. 28, 1974

[21] Appl. No.: 501,217

[30] Foreign Application Priority Data
Sept. 28, 1973 Sweden .............................. 7313231

[52] U.S. Cl. .................. 177/17; 177/147; 177/211
[51] Int. Cl.² ............. G01G 19/40; G01G 19/14; G01G 3/14
[58] Field of Search ........ 177/15, 17, 147, 208, 211

[56] References Cited
UNITED STATES PATENTS

| | | | |
|---|---|---|---|
| 1,997,864 | 4/1935 | Hill | 177/208 |
| 2,590,626 | 3/1952 | Jones | 177/211 X |
| 2,616,683 | 11/1952 | Le Ferre, Jr. | 177/211 |
| 2,643,872 | 6/1953 | Wise | 177/208 |
| 2,643,873 | 6/1953 | Wise | 177/208 |
| 2,646,273 | 7/1953 | Wetsel | 177/147 |
| 2,920,654 | 1/1960 | Wise | 177/208 X |
| 3,017,939 | 1/1962 | Vegors | 177/208 |

Primary Examiner—George H. Miller, Jr.
Attorney, Agent, or Firm—Pierce, Scheffler & Parker

[57] ABSTRACT

An apparatus for gathering measuring values obtained when weighing unit loads, the value obtained for each weighing being accumulated in a separate receiver means, which comprises a hollow, downwardly open frame forming an internal space in which a support connected to the frame 1 is provided. The support extends transversely across said space to form a passageway for a load carrier which is movable in said space to the inner wall of the frame, which load carrier encloses said support and is adapted to receive a known pressure-sensitive member for delivering a load measuring value for registration in said receiver means.

4 Claims, 2 Drawing Figures

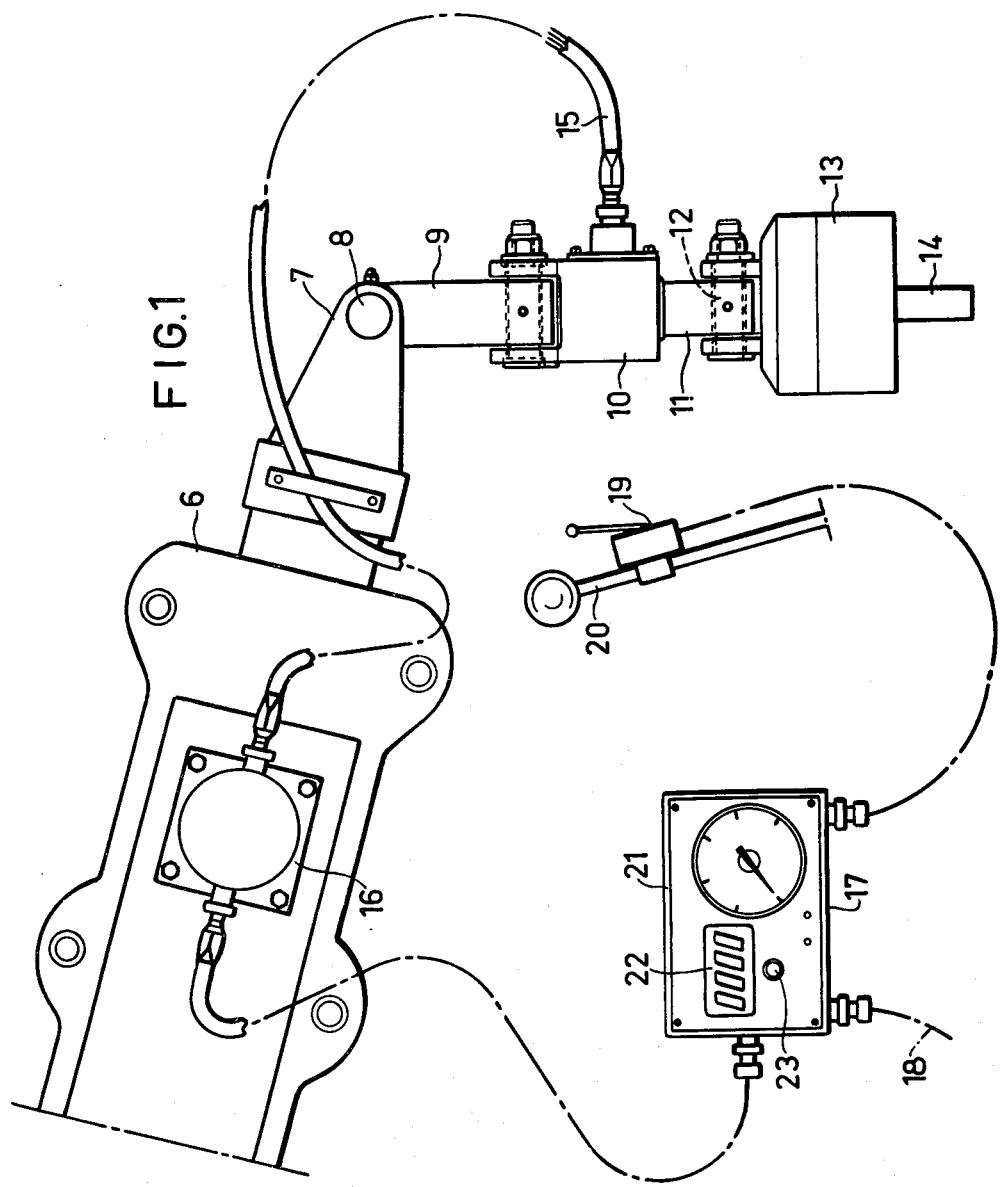

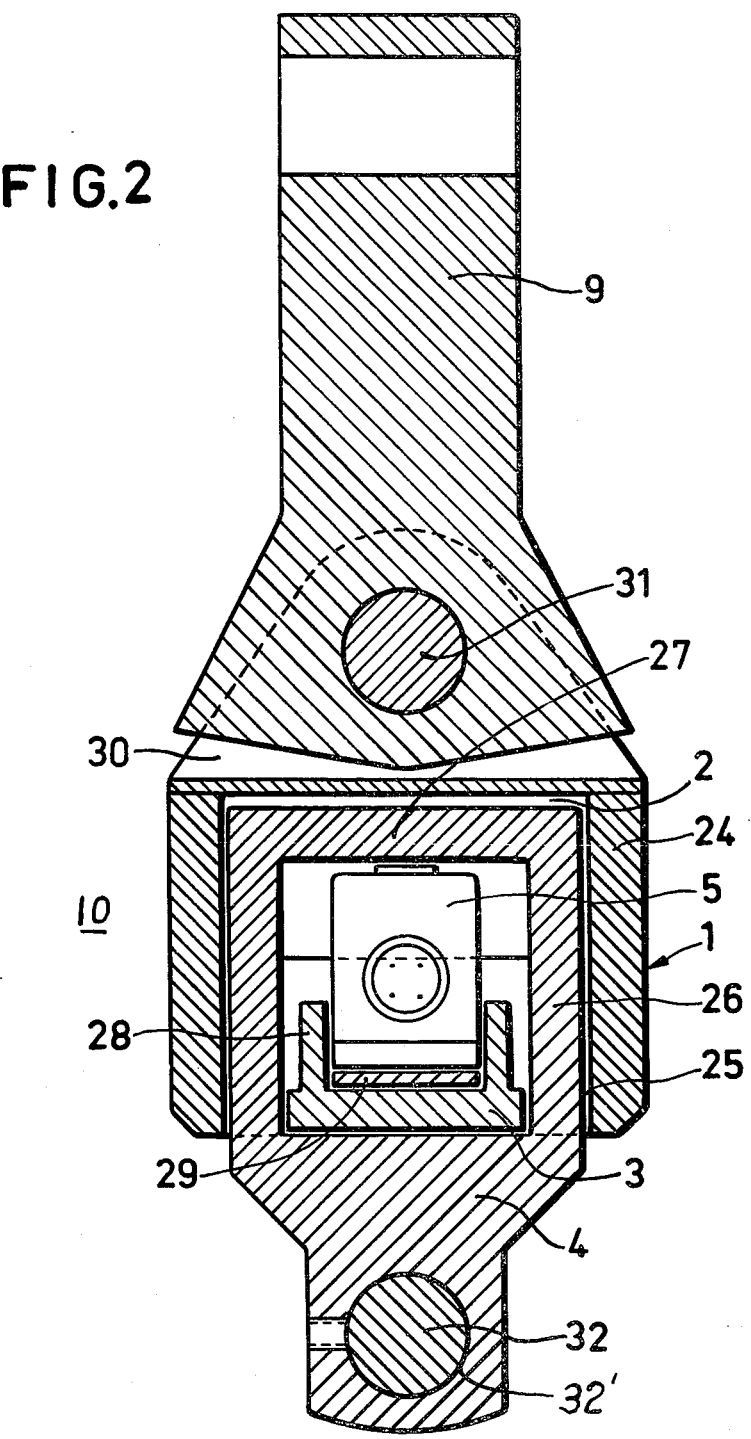

MEASURING DEVICE

This invention relates to a device adapted to gather measuring values obtained when weighing unit loads.

The device is of the kind which emits an electric signal proportional to the load weight for each weighing operation, which signal is gathered and registered in a receiver means.

Several proposals concerning such devices have been made previously, and some of them have been put to practical use. The previously known devices, show, however, the disadvantage of not being capable to take up the forces, e.g. torsional forces, arising in conjunction with the relatively violent handling which a loading operation necessarily involves. These forces have a detrimental effect on the measuring data obtained and give rise to uncertainty on the weight of the total lifted load.

A further disadvantage of conventional devices is the difficulty of effectuating an accurate summing up of the different partial loads.

The present invention, which has eliminated these disadvantages, comprises a load transmitter designed in a special way, as will become apparent from the accompanying specific description taken with the following claims and with the appended drawing, in which FIG. 1 shows an assembly of arrangements for the weighing of loads, including a crane jib, load transmitter and receiver means; and FIG. 2 shows an embodiment of the load transmitter according to the invention.

In FIG. 1 there is shown a portion of a jib 6 at the outer end 7 of which a load transmitter assembly 9, 10, 11 is rotatably suspended about axle 8. At the lower end 11 of load transmitter 10 a rotary table 13 is movably suspended about axle 12 and takes up the torsion of the load about a vertical line through axle 8. The load in its turn is suspended in connection means 14 of the rotary table by means of grapple members (not shown).

The weight of each lifted load is measured by load transmitter assembly 9, 10, 11, and the resulting signal is led via cable 15 over a connecting box 16, which is disposed e.g. on jib 6, and from thence to a receiver instrument 17 which is supplied with the necessary electric energy from an energy source, for example a battery, through a line 18. The gathering of measuring data is directed by a contact means 19, which is located suitably for the operation, for example, as shown in the figure, by arranging contact means 19 in connection to a control level 20 of the crane. Receiver means 17 per se comprises an instrument 21 for partial weights showing the weight of each load and an instrument 22 for the total weight. The receiver means further comprises a contact 23 for zero setting.

The apparatus shown in FIG. 1 operates in principle as follows. The load, which is suspended in holding means 14 by means of grapple members of different design, is lifted by jib 6. The load transmitter 10 hereby emits — in the manner described below — a signal via cable 15 to receiver 17 where the signal is registered as "partial weight" in instrument 21. This value can then be accumulated in a register 22 by contact means 19, so that the register at any time shows the total load lifted by the lifting unit. The loading personnel can hereby obtain information on the accurate total weight of the load transferred to the goods vehicle and hence keep the load within the limit values permitted by the pertaining regulations.

In order to make it possible to carry out the operation as described above, the load transmitter 10 has been given a special design as shown in FIG. 2.

In FIG. 2 this load transmitter 10 is shown in vertical section. It comprises a box-shaped frame 1 which in operation has vertical disposition, and the walls 24 of which enclose a downwardly open space 2. Transversely across said space and in the vicinity of its opening a support 3 extends in rigid connection with two diametrically opposed walls, but so spaced from adjoining walls that between these walls and the support 3 there is formed a passageway 25 in which a load carrier 4 is vertically slidably mounted. The load carrier has vertical walls 26 and a substantially horizontal beam 27, so that the load carrier encloses the support 3 and establishes a space, in which a pressure-sensitive member 5 is inserted. Upon the application of load on the load carrier, the member 5 is exposed to pressure between the support 3 and beam 27. This pressure is converted — in a manner known per se — into a signal which is registered and accumulated in the manner described above.

In order to render it possible to insert the pressure-sensitive member 5, the so-called "pressure cell," on the support 3, one wall of frame 1 is provided with an opening (not shown), which can be locked by a cover. The cell is held in position by walls 28 provided on each side of the cell with rigid connection to the support. A support plate 29 insertible below the cell 5 facilitates the maintenance of the cell in its position.

The suspension of the load transmitter and connection to the crane and, respectively, load (via the rotary table) are essential for the operation of the device. The construction must be capable of taking up the torsional forces arising during the handling of the load, in order that the weighing result not be affected by disturbing forces. It is also important that the suspension be arranged so that the center of gravity is located vertically below the pressure cell without break of the load transmitter. For accomplishing this, the frame 1 of load transmitter 10 is provided upwardly with two vertically extending lugs 30, 30 with cylindric holes therein for receiving an axle journal 31 by means of which the frame is movably suspended in an intermediate link 9. This intermediate link 9 in its turn is connected with the jib 6 of the crane by means of an additional horizontally disposed axle journal 8 extending perpendicularly to axle journal 31.

At its lower end portion load carrier 4 of the load transmitter 1 is rotatably connected with table 13 by means of an axle journal 32 which is substantially in parallel with axle journal 31.

We claim:

1. Apparatus for gathering measuring data obtained when weighing unit loads, the data obtained for each weighing being accumulated in a separate receiver means (17), which apparatus comprises a load transmitter (10) including a hollow downwardly open frame (1) comprising vertical walls (26) and a substantially horizontal beam (27), said open frame (1) having formed therein an internal space (2);

a support (3) rigidly connected to frame (1) and disposed in said internal space (2), said support (3) extending transversely across said space to form a passageway (25) for a load carrier (4) movable in said space (2) to the inner wall of frame (1);

said load carrier (4) enclosing said support (3), and a pressure-sensitive member (5) borne on said support (3) which member, upon load application of the load carrier (4) is exposed to pressure between said support (3) and said horizontal beam (27) and delivers a measuring value for registration in the aforesaid receiver means (17)

the load transmitter being connected to an intermediate link (9) at the top by means of an axle (31) and at the bottom connected to a load carrier (4) by means of an axle (32).

2. The apparatus defined in claim 1, wherein said intermediate link (9) is rotatably supported by a lift means through a substantially horizontal axle (8), said axles (8) and (32) being parallel to each other and being perpendicular to axle (31).

3. Apparatus as defined in claim 1, wherein the frame (1) of load transmitter (10) is suspended from vertically extending connecting members (30), in the form of two lugs provided on each lateral edge of the frame (1) of load transmitter (10) and having holes for receiving axle journal (31), which journal is supported by said intermediate link (9) provided above the load transmitter.

4. Apparatus as defined in claim 1, wherein the load carrier (4) for connection to a suspended load comprises axle journal (32) rotatably supported in a hole (32'), to which axle journal there is connected the suspension means for the load in the form of a rotary table (13).

* * * * *